(12) United States Patent
Kobashi (10) Patent No.: US 11,065,885 B2
(45) Date of Patent: Jul. 20, 2021

(54) RECORDING METHOD, INK SET, AND PRINTING APPARATUS

(71) Applicant: SEIKO EPSON CORPORATION, Tokyo (JP)

(72) Inventor: Yutaka Kobashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/718,362

(22) Filed: Dec. 18, 2019

(65) Prior Publication Data

US 2020/0198368 A1    Jun. 25, 2020

(30) Foreign Application Priority Data

Dec. 20, 2018 (JP) ............................. JP2018-237839

(51) Int. Cl.
| | |
|---|---|
| *B41J 2/21* | (2006.01) |
| *B41M 5/00* | (2006.01) |
| *C09D 11/40* | (2014.01) |
| *C09D 11/54* | (2014.01) |
| *B41J 11/00* | (2006.01) |

(52) U.S. Cl.
CPC .......... *B41J 2/2114* (2013.01); *B41J 11/0015* (2013.01); *B41M 5/0017* (2013.01); *B41M 5/0023* (2013.01); *C09D 11/40* (2013.01); *C09D 11/54* (2013.01)

(58) Field of Classification Search
CPC .. B41J 2/2114; B41J 11/0015; B41M 5/0017; B41M 5/0023; C09D 11/40; C09D 11/54
See application file for complete search history.

(56) References Cited

U.S. PATENT DOCUMENTS

| | | |
|---|---|---|
| 2004/0189775 A1 | 9/2004 | Lee et al. |
| 2009/0153613 A1 | 6/2009 | Yamanobe |
| 2009/0233061 A1 | 9/2009 | Irita |
| 2015/0091974 A1* | 4/2015 | Aoyama ................ C09D 11/54 347/21 |
| 2015/0174939 A1 | 6/2015 | Aoyama et al. |

FOREIGN PATENT DOCUMENTS

| | | | |
|---|---|---|---|
| JP | 2001199150 A | * | 7/2001 |
| JP | 2004-512987 A | | 4/2004 |
| JP | 2009-196309 A | | 9/2009 |
| JP | 2009-214491 A | | 9/2009 |
| JP | 2015-091640 A | | 5/2015 |
| JP | 2015-143003 A | | 8/2015 |

* cited by examiner

*Primary Examiner* — Sharon Polk
(74) *Attorney, Agent, or Firm* — Global IP Counselors, LLP (57) ABSTRACT

Provided is a recording method including: a first applying step of applying anionic first processing liquid on a medium; a second applying step of applying cationic second processing liquid on the medium, causing the first processing liquid and the second processing liquid to react with each other, and generating mixed liquid, subsequently to the first applying step; and a first drying step of drying the mixed liquid subsequently to the second applying step, in which the mixed liquid is cationic.

15 Claims, 5 Drawing Sheets

RECORDING METHOD, INK SET, AND PRINTING APPARATUS

The present application is based on, and claims priority from JP Application Serial Number 2018-237839, filed Dec. 20, 2018, the disclosure of which is hereby incorporated by reference herein in its entirety.

BACKGROUND

1. Technical Field

The present disclosure relates to a recording method, an ink set, and a printing apparatus.

2. Related Art

In printing processing that adheres ink to a medium and thus forms an image on the medium, during an interval from when the ink is adhered to the medium to when water in the ink is dried, in some instances, ink bleeding occurs due to diffusion of color material in the ink, and printing image quality decreases. A technology is known in which, in order to prevent a degradation in printing image quality due to the ink bleeding, before the ink is adhered to the medium, a fixing solution that causes color material in the ink to shrink is applied on the medium, thereby preventing the bleeding from occurring. For example, in JP-T-2004-512987, a technology is disclosed in which, before anionic ink is adhered to the medium, a cationic solution is applied to the medium, thereby preventing the ink bleeding from occurring.

However, in a technology in the related art, during the interval from when the ink is adhered to the medium to when water in the ink is dried, in some instances, because color material and resin in the ink react with the fixing solution and shrink, a phenomenon called excessive condensing, in which an image that has to be formed on the medium also shrink, occurs.

SUMMARY

A recording method according to an aspect of the present disclosure includes: a first applying step of applying anionic first processing liquid on a medium; a second applying step of applying cationic second processing liquid on the medium, causing the first processing liquid and the second processing liquid to react with each other, and generating mixed liquid, subsequently to the first applying step; and a first drying step of drying the mixed liquid subsequently to the second applying step, in which the mixed liquid is cationic.

DESCRIPTION OF EXEMPLARY EMBODIMENTS

An embodiment of the present disclosure will be described below with reference to the drawings. However, a dimension and scale of each unit in each drawing are set to be suitably different from an actual dimension and scale there, respectively. Furthermore, an embodiment that will be described below is a specific example of the present disclosure, and because of this, various limitations that are technically desirable are imposed. However, as long as the present disclosure is not particularly described as being limited in the following description, the scope of the present disclosure is not limited to the embodiment.

A. Embodiment

1. Outline of Ink Jet Printer

In the present embodiment, a printing apparatus is described, taking, as an example, an ink jet printer 1 that discharges ink and forms an image on a recording medium P. It is noted that in the present embodiment, the recording medium P is an example of a "medium."

Figure 1:
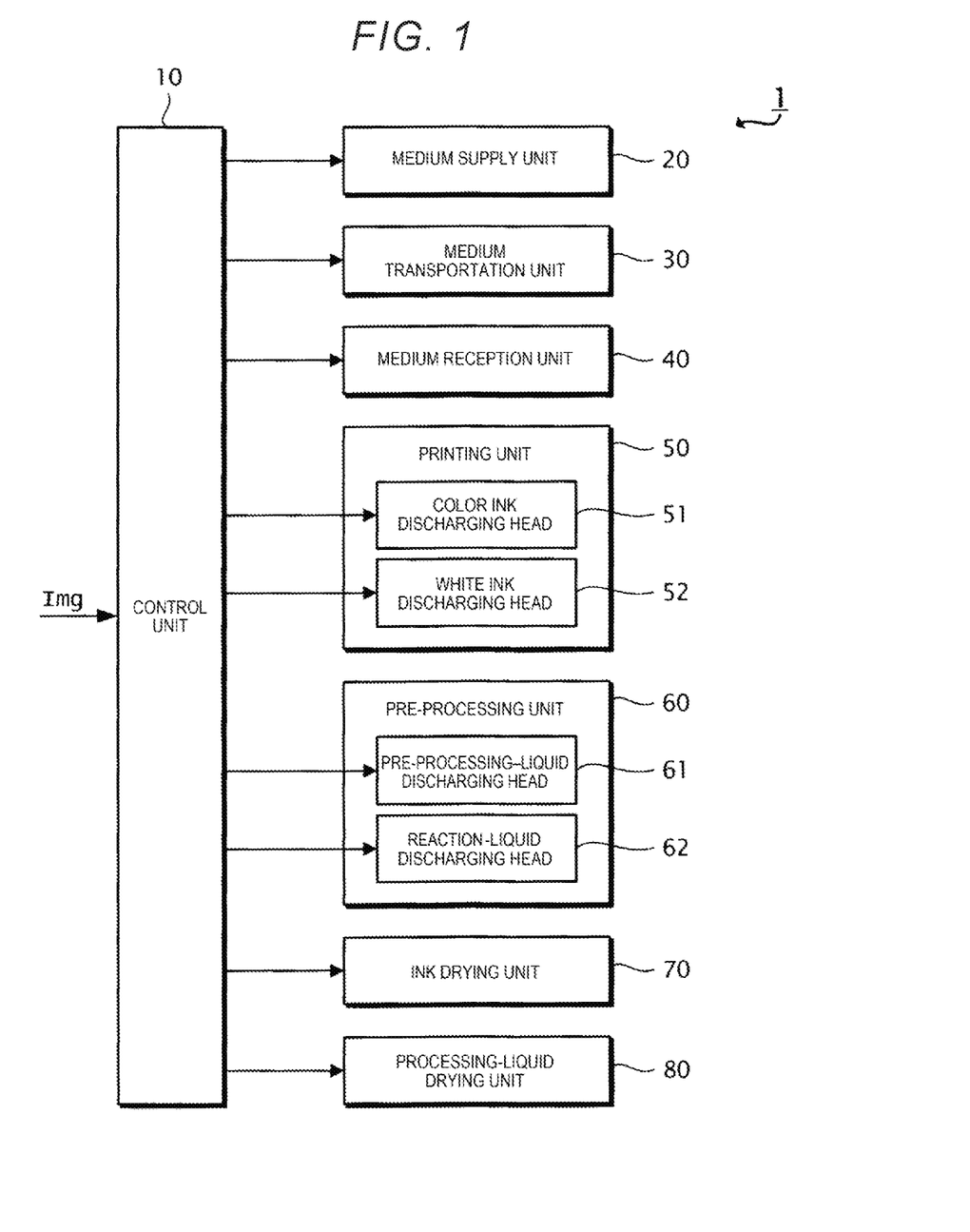
FIG. 1 is a functional block diagram illustrating an example of a configuration of an ink jet printer relating to an embodiment of the present disclosure.
Figure 2:
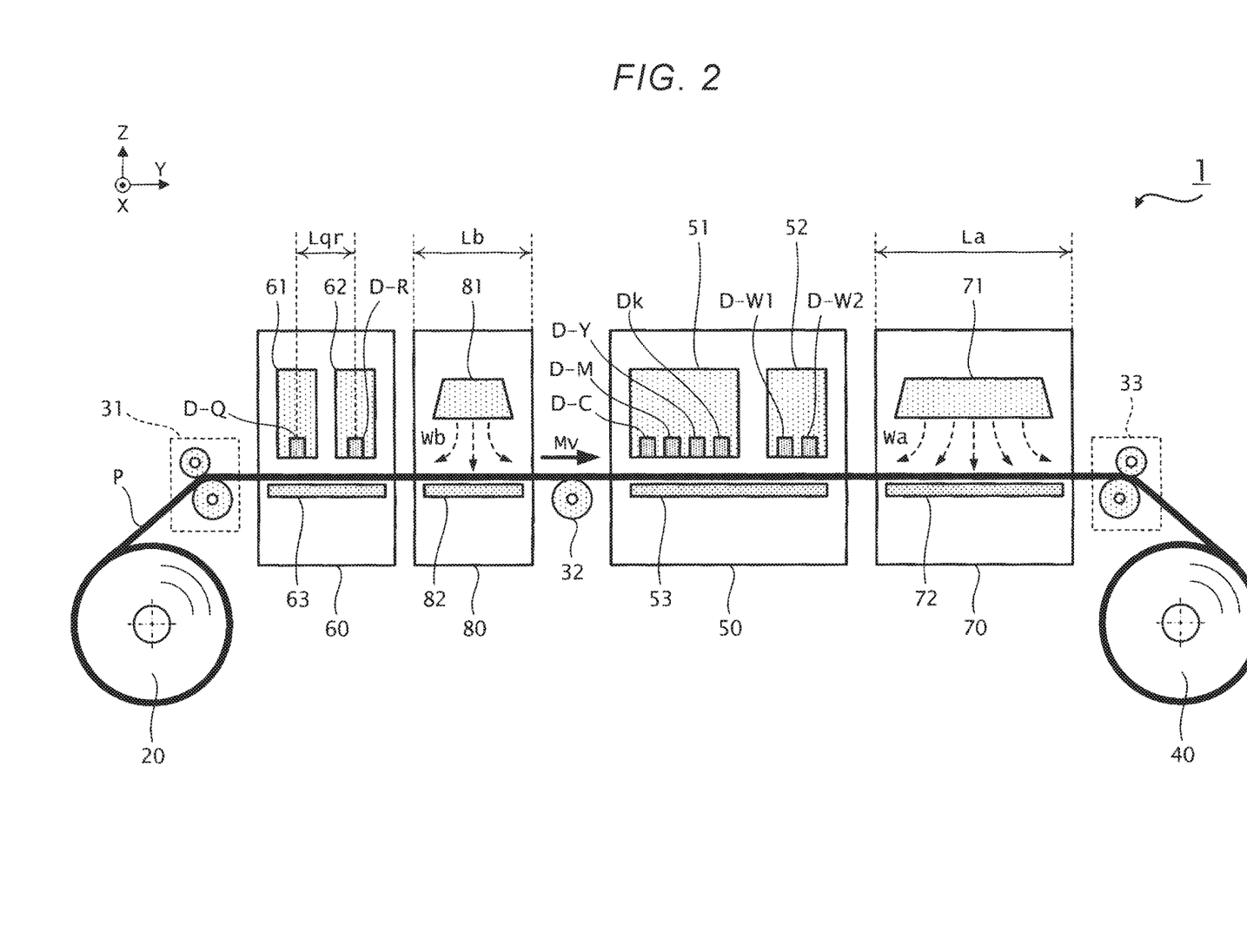
FIG. 2 is a descriptive diagram illustrating an example of a schematic cross-sectional structure of the ink jet printer.

A configuration of the ink jet printer 1 according to the present embodiment will be described below with reference to FIGS. 1 and 2. FIG. 1 is a functional block diagram illustrating an example of a functional configuration of the ink jet printer 1. FIG. 2 is a descriptive diagram illustrating an example of a schematic cross-sectional structure of the ink jet printer 1.

As illustrated in FIG. 1, printing data Img, which represents an image that has to be formed by the ink jet printer 1, is supplied from a host computer, such as a personal computer or a digital camera, to the ink jet printer 1. The ink jet printer 1 performs printing processing that forms an image that represents the printing data Img which is supplied from the host computer, on the recording medium P.

As illustrated in FIG. 1, the ink jet printer 1 includes a control unit 10 that controls each unit of the ink jet printer 1, a printing unit 50 that performs printing processing that adheres ink to the recording medium P and thus forms an image on the recording medium P, a pre-processing unit 60 that performs pre-processing that applies pre-processing liquid Qq and reaction liquid Qr on the printing medium P before the printing processing is performed on the printing medium P, a medium transportation unit 30 that transports the recording medium P to the printing unit 50 when the printing processing is performed, a medium supply unit 20 that supplies the recording medium P to the medium transportation unit 30 when the printing processing is performed, a medium reception unit 40 that receives the recording medium P on which the image is formed by performing the printing processing, an ink drying unit 70 that performs ink drying processing that dries the ink which is adhered to the recording medium P in the printing processing, and a processing-liquid drying unit 80 that performs processing-liquid drying processing which dries the pre-processing liquid Qq and the reaction liquid Qr which are applied on the recording medium P in the pre-processing. It is noted that in some instances, the printing processing, the pre-processing, the ink drying processing, and the processing-liquid drying processing are hereinafter referred to as image formation processing.

In the present embodiment, as illustrated in FIG. 2, as an example, an instance is assumed where the ink jet printer 1 performs the image formation processing while transporting the recording medium P in the positive Y direction. A path along which the ink jet printer 1 transports the recording medium P when the ink jet printer 1 performs the image formation processing is hereinafter referred to as a transportation path. It is noted that in the present embodiment, as an example, an instance is assumed where the transportation path is a path in the form of a straight line in the positive Y direction, but the transportation path may be a path in the form of a curved line and may be a path in the form of a broken line.

Furthermore, in the present embodiment, as illustrated in FIG. 2, as an example, an instance is assumed where the recording medium P is a windable long-length medium. More specifically, in the present embodiment, an instance is assumed where a length of the recording medium P in a direction in which the transportation path extends is longer than a path length of the transportation path. However, the recording medium P, for example, may be a sheet in the form of a rectangle, such as a paperboard, or may be a plastic substrate, a ceramic substrate, or a glass substrate.

The control unit 10, for example, is configured to include a CPU, and controls each unit of the ink jet printer 1. It is noted that instead of the CPU or in addition to the CPU, the control unit 10 may include a programmable logic device, such as an FPGA, an analog circuit, or the like.

When the printing processing is performed on the recording medium P, the medium transportation unit 30 transports the recording medium P at a speed of Mv in the positive Y direction. Specifically, the medium transportation unit 30 includes transportation rollers 31, 32, and 33 that are driven rotatably under the control of the control unit 10. Then, when the printing processing is performed on the recording medium P, the control unit 10 rotatably drives the transportation rollers 31, 32, and 33 in such a manner that the recording medium P moves at the speed of Mv in the positive Y direction. It is noted that in the present embodiment, the speed of Mv is preferably equal to or higher than 30 m per minute and equal to or lower than 300 m per minute, and more preferably equal to or higher than 50 m per minute and equal to or lower than 200 m per minute.

The medium supply unit 20 accommodates the recording medium P in a state of being wound in a rolled shape. Then, when the printing processing is performed on the recording medium P, the medium supply unit 20 supplies the recording medium P to the medium transportation unit 30. Specifically, when the printing processing is performed on the recording medium P, the medium supply unit 20 is rotatably driven under the control of the control unit 10 and thus supplies the recording medium P to the medium transportation unit 30.

However, the medium supply unit 20 is not limited to an aspect of the present embodiment. For example, the medium supply unit 20 is freely rotatable in the vicinity of an X axis that extends in the positive X direction which intersects the positive Y direction. The medium supply unit 20 may employ a configuration in which the recording medium P that is accommodated in the state of being wound in a rolled shape is drawn according to the transportation rollers 31, 32, and 33 being rotatably driven, and may employ a structure in which, when the recording medium P is a paperboard, paperboards are supplied one at a time from a document feeder. Furthermore, a static-electricity removal unit for removing static electricity from the recording medium P may be included, and a corona processing unit for controlling wettability of the recording medium P may be included.

The medium reception unit 40 accommodates the recording medium P received from the medium transportation unit 30, in the state of being wound in a rolled shape. Specifically, when the printing processing is performed on the recording medium P, the medium reception unit 40 is rotatably driven under the control of the control unit 10 and thus receives the recording medium P from the medium transportation unit 30. It is noted that a humidity control unit which controls humidity in the vicinity of the medium reception unit 40 may be provided in the ink jet printer 1 in order to prevent troublesome situations, such as "offset" that results from an image formed on the recording medium P being adhered to a portion or the like on which an image is not supposed to be formed, of the recording medium P, and "blocking" that results from recording media P wound in the state of being wound in a rolled shape sticking to each other. Specifically, the ink jet printer 1, for example, may include an external cover that covers the medium reception unit 40 and a humidity control unit that controls humidity within the external cover.

The printing unit 50 includes a platen 53 that is provided along the transportation path, a color ink discharging head 51 that discharges color ink on the recording medium P that is transported over the platen 53, and a white ink discharging head 52 that discharges white ink on the recording medium P that is transported over the platen 53.

In the present embodiment, as an example, an instance is assumed where the color ink that is discharged from the color ink discharging head 51 contains four color inks, a cyan ink, a magenta ink, a yellow ink, and a black ink. Then, in the present embodiment, the color ink discharging head 51 includes a cyan nozzle column NL-C in which multiple cyan discharging units D-C, each discharging a cyan ink, are arranged to be lined up in the positive X direction, a magenta nozzle column NL-M in which multiple magenta discharging units D-M, each discharging a magenta ink, are arranged to be lined up in the positive X direction, a yellow nozzle column NL-Y in which multiple yellow discharging units D-Y, each discharging a yellow ink, are arranged to be lined up in the positive X direction, and a black nozzle column NL-K in which multiple black discharging units D-K, each discharging a black ink, are arranged to be lined up in the positive X direction.

Furthermore, in the present embodiment, the white ink discharging head 52 includes a white nozzle column NL-W1 in which multiple white discharging units D-W1, each discharging a white ink, are arranged to be lined up in the positive X direction, and a white nozzle column NL-W2 in which multiple white discharging units D-W2, each discharging a white ink, are arranged to be lined up in the positive X direction, more toward the positive Y direction than the white nozzle column NL-W1. In this manner, the column number of nozzle columns that correspond to the white ink is set to be two times the column number of nozzle columns that correspond to the color ink, and thus concentration of white that is necessary for concealment can be sufficiently ensured. It is noted that in the present embodiment, "reverse printing" is assumed that results from employing a configuration in which first, the color ink and then, the white ink are prearranged to be printed on the recording medium P, and in which the completed image is prearranged to be observed from a rear surface of the recording medium P, that is, from a surface that is opposite in direction to a surface to which the ink is adhered, of the recording medium P. However, this configuration is an example, and, depending on an intended use, "surface printing" may be employed in which the white ink is printed on the recording medium P earlier than the color ink, or an aspect may be employed in which only the color ink is printed without the white ink.

In some instances, the cyan discharging unit D-C, the magenta discharging unit D-M, the yellow discharging unit D-Y, the black discharging D-K, the white discharging unit D-W1, and the white discharging unit D-W2 are hereinafter collectively referred to as an "ink discharging unit D-IN. Furthermore, the cyan nozzle column NL-C, the magenta nozzle column NL-M, the yellow nozzle column NL-Y, the black nozzle column NL-K, the white nozzle column NL-W1, and the white nozzle column NL-W2 are hereinafter collectively referred to as an ink nozzle column NL-IN.

When the printing processing is performed on the recording medium P, under the control of the control unit 10, the printing unit 50 discharges ink from the ink discharging unit D-IN in such a manner that the image representing the printing data Img is formed on the recording medium P.

It is noted that in the present embodiment, an instance is assumed where each ink nozzle column NL-IN is provided in such a manner that a width in the positive X direction, of each ink nozzle column NL-IN is equal to or greater than a width in the positive X direction, of the recording medium P. For this reason, the ink jet printer 1 according to the present embodiment can discharge each of the color inks on the entire recording medium P that is transported in the positive Y direction.

The pre-processing unit 60 includes a platen 63 that is provided along with the transportation path, a pre-processing-liquid discharging head 61 that discharges the pre-processing liquid Qq on the recording medium P that is transported over the platen 63, and a reaction-liquid discharging head 62 that discharges the reaction liquid Qr on the recording medium P that is transported over the platen 63.

In the present embodiment, the pre-processing-liquid discharging head 61 includes a pre-processing-liquid nozzle column NL-Q in which multiple pre-processing-liquid discharging units D-Q, each discharging the pre-processing liquid Qq, are arranged to be lined up in the X direction. Furthermore, in the present embodiment, the reaction-liquid discharging head 62 includes a reaction-liquid nozzle column NL-R in which multiple reaction-liquid discharging units D-R, each discharging the reaction liquid Qr, are arranged to be lined up in the X direction, more toward the positive Y direction than the pre-processing-liquid nozzle column NL-Q.

In some instances, the pre-processing-liquid discharging unit D-Q and the reaction-liquid discharging unit D-R are hereinafter collectively referred to as a processing-liquid discharging unit D-SH. Then, in some instance, the ink discharging unit D-IN and the processing-liquid discharging unit D-SH are hereinafter collectively referred to as a discharging unit D. In the present embodiment, the discharging unit D discharges liquid such as ink using an ink jet method.

Furthermore, in some instances, the pre-processing-liquid nozzle column NL-Q and the reaction-liquid nozzle column NL-R are hereinafter collectively referred to as a processing-liquid nozzle column NL-SH. Then, in some instance, the ink nozzle column NL-IN and the processing-liquid nozzle column NL-SH are hereinafter collectively referred to as a nozzle column NL. As described above, in the present embodiment, an instance is assumed where the nozzle column NL extends in the positive X direction. However, the aspect of the present embodiment is an example, and the nozzle column NL may extend in a direction that intersects the positive Y direction, in a wider range than the recording medium P. That is, in the present embodiment, the color ink discharging head 51, the white ink discharging head 52, the pre-processing-liquid discharging head 61, and the reaction-liquid discharging head 62 are so-called line-type ink jet heads. Printing at a high speed, such as a printing speed of 50 m per minute to 300 m per minute, is possible by employing the line-type ink jet head in the color ink discharging head 51, the white ink discharging head 52, the pre-processing-liquid discharging head 61, and the reaction-liquid discharging head 62. It is noted that for an intended use, or the like that does not require high-speed printing, a so-called serial-type or multi-path-type configuration may be employed in which an image is formed while reciprocating the discharging head in a direction orthogonal to a direction of transportation of the recording medium P, for example, in the positive X direction in FIG. 2 and the negative X direction that is opposite to the positive X direction.

When the pre-processing is performed on the recording medium P, under the control of the control unit 10, the pre-processing unit 60 causes the pre-processing liquid Qq or the reaction liquid Qr to be discharged from each processing-liquid discharging unit D-SH in such a manner that the pre-processing liquid Qq and the reaction liquid Qr are applied on the recording medium P.

It is noted that in the present embodiment, a gap Lqr in the positive Y direction between the pre-processing-liquid discharging unit D-Q and the reaction-liquid discharging unit D-R, for example, is equal to or longer than a distance Lqr1 with which it is possible that the pre-processing liquid Qq, discharged from the pre-processing-liquid discharging unit D-Q, is prevented from being adhered to the reaction-liquid discharging unit D-R and that the reaction liquid Qr, discharged from the reaction-liquid discharging unit D-R, is prevented from being adhered to the pre-processing-liquid discharging unit D-Q. Specifically, it is preferable that the distance Lqr1, for example, is a distance that is equal to or longer than a distance in the positive Z direction between the processing-liquid discharging unit D-SH and the platen 63. More specifically, the distance Lqr1, for example, is preferably a distance of 3 cm or more, is more preferably a distance of 8 cm or more, and is further more preferably a distance of 10 cm or more. At this point, the positive Z direction is a direction that intersects the positive X direction and the positive Y direction, and is a direction that is opposite to a direction in which the pre-processing liquid Qq or the reaction liquid Qr is discharged from the processing-liquid discharging unit D-SH. For example, when the speed Mv is 50 m per minute, the distance Lqr1 may be a distance that is such that the time that it takes for the recording medium P to pass the negative Z side of the reaction-liquid discharging unit D-R after the recording medium P passes the negative Z side of the pre-processing-liquid discharging unit D-Q is equal to or longer than 0.036 seconds, more preferably equal to or longer than 0.1 seconds, and further more preferably equal to or longer than 0.12 seconds.

Furthermore, in the present embodiment, the gap Lqr is set to be equal to or shorter than a distance Lqr2 that is such that the pre-processing liquid Qq discharged from the reaction-liquid discharging unit D-R is adherable to the recording medium P before the pre-processing liquid Qq that is adhered to the recording medium P after being discharged from the pre-processing-liquid discharging unit D-Q is dried. Specifically, the distance Lqr2, for example, may be a distance that is such that, when the recording medium P is transported at the speed Mv, the time that it takes for the recording medium P to pass the negative Z side of the reaction-liquid discharging unit D-R after the recording medium P passes the negative Z side of the pre-processing-liquid discharging unit D-Q is equal to or shorter than 1 second and more preferably equal to or shorter than 0.6 seconds. More specifically, when the speed Mv is 50 m per minute, the distance Lqr2 is set to be equal to or shorter than 83 cm, and more preferably equal to or shorter than 50 cm.

In this manner, in the present embodiment, the gap Lqr is set to be equal to or longer than the distance Lqr1 and to be equal to or shorter than the distance Lqr2, and thus it is possible not only that a discharging defective due to mist adhesion to the processing-liquid discharging unit D-SH is prevented, but also that the pre-processing liquid Qq and the reaction liquid Qr are caused to react with each other.

The ink drying unit 70 includes a support portion 72 that supports the recording medium P which is transported along the transportation path, and an air blowing unit 71 that applies air Wa to the recording medium P which is transported over the support portion 72. Under the control of the control unit 10, in the ink drying processing, the air blowing unit 71 blows the air Wa at an air-blowing speed Va at a temperature Ta onto the recording medium P that is transported over the support portion 72, and thus dries the ink adhered to the recording medium P. In the present embodiment, the temperature Ta of the air Wa, for example, is preferably equal to or higher than 40° C. and equal to or lower than 120° C., more preferably equal to or higher than 60° C. and equal to or lower than 100° C., and further more preferably equal to or higher than 70° C. and equal to or lower than 90° C. Furthermore, in the present embodiment, the air-blowing speed Va of the air Wa, for example, is preferably equal to or higher than 1 m per second and equal to or lower than 20 m per second, more preferably equal to or higher than 3 m per second and equal to or lower than 15 m per second, and further more preferably equal to or higher than 5 m per second and equal to or lower than 10 m per second.

It is noted that in the present embodiment, the ink drying unit 70 blows the air Wa at the speed Ta onto the recording medium P and thus dries the ink adhered to the recording medium P, but the ink drying unit 70 is not limited to this aspect. For example, the ink drying unit 70 may include an infrared heater of which an illustration is omitted, and with radiant heat from the infrared heater, may set a temperature of a surface of the recording medium P to the temperature Ta, thereby drying the ink adhered to the recording medium P. The ink drying unit 70 may heat the ink adhered to the recording medium P using a microwave. Furthermore, these methods may be used in combination.

The processing-liquid drying unit 80 includes a support portion 82 that supports the recording medium P which is transported along the transportation path, and an air blowing unit 81 that applies air Wb to the recording medium P that is transported over the support portion 82. Under the control of the control unit 10, in the processing-liquid drying processing, the air blowing unit 81 blows the air Wb at an air-blowing speed Vb at a temperature Tb onto the recording medium P that is transported over the support portion 82, and thus dries the pre-processing liquid Qq and the reaction liquid Qr that are adhered to the recording medium P. In the present embodiment, the temperature Tb of the air Wb, for example, is preferably equal to or higher than 40° C. and equal to lower than 120° C., more preferably equal to or higher than 60° C. and equal to or lower than 100° C., and further more preferably equal to or higher 70° C. and equal to or lower than 90° C. Furthermore, in the present embodiment, the air-blowing speed Vb of the air Wb, for example, is preferably equal to or higher than 1 m per second and equal to or lower than 20 m per second, more preferably equal to or higher than 3 m per second and equal to or lower than 15 m per second, and further more preferably equal to or higher than 5 m per second and equal to or lower than 10 m per second.

It is noted that in the present embodiment, the processing-liquid drying unit 80 blows the air Wb at the temperature Tb onto the recording medium P and thus dries the pre-processing liquid Qq and the reaction liquid Qr that are adhered to the recording medium P, but the processing-liquid drying unit 80 is not limited to this aspect. For example, the processing-liquid drying unit 80 may include an infrared heater of which an illustrating is omitted, and with radiant heat from the infrared heater, may set the temperature of the surface of the recording medium P to the temperature Tb, thereby drying the pre-processing liquid Qq and the reaction liquid Qr that are adhered to the recording medium P. The processing-liquid drying unit 80 may heat the pre-processing liquid Qq and the reaction liquid Qr that are adhered to the recording medium P using a microwave. Furthermore, these methods may be used in combination.

Furthermore, in the present embodiment, a length La in the positive Y direction, of the ink drying unit 70 may be longer than a length Lb in the positive Y direction, of the processing-liquid drying unit 80. That is, in the present embodiment, the time taken to perform the ink drying processing on the recording medium P may be set to be longer than the time taken to perform the processing-liquid drying processing. Accordingly, in the present embodiment, it is possible that the adhesion of the ink to the recording medium P is increased when compared with an aspect in which the time taken to perform the ink drying processing on the recording medium P is set to be equal to or shorter than the time taken to perform the processing-liquid drying processing.

2. Outline of Image Formation Processing

An outline of the image formation processing according to the present embodiment will be described below with reference to FIGS. 3 to 8.

Figure 3:
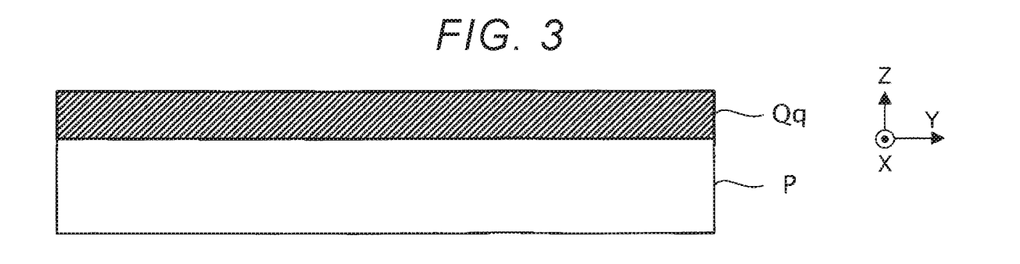
FIG. 3 is a descriptive diagram for describing an example of pre-processing.
Figure 4:
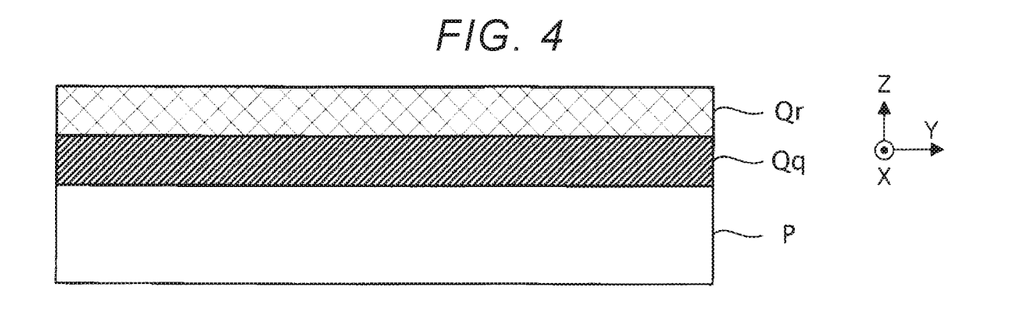
FIG. 4 is a descriptive diagram for describing an example of the pre-processing.

FIGS. 3 and 4 are diagrams illustrating an aspect of the recording medium P that results when the pre-processing is performed as the image formation processing. As described above, first, the ink jet printer 1 performs the pre-processing that applies the pre-processing liquid Qq and the reaction liquid Qr on the recording medium P, as the image formation processing.

The pre-processing includes a pre-processing-liquid applying step of applying the pre-processing liquid Qq on the recording medium P, as illustrated in FIG. 3, and a reaction-liquid applying step of applying the reaction liquid Qr on the recording medium P subsequently to the pre-processing-liquid applying step, as illustrated in FIG. 4. At this point, the pre-processing-liquid applying step is an example of a "first applying step," and the reaction-liquid applying step is an example of a "second applying step." Furthermore, the pre-processing liquid Qq is an example of "first processing-liquid," and the reaction liquid Qr is an example of "second processing-liquid." Furthermore, the pre-processing-liquid discharging head 61 that performs the pre-processing-liquid applying step is an example of a "first applying unit," and the reaction-liquid discharging head 62 that performs the reaction-liquid applying step is an example of a "second applying unit."

In the present embodiment, a transparent resin film having transparency, such as a polyethylene terephthalate film, a biaxially oriented polypropylene film, or a biaxially oriented nylon film, is employed as the recording medium P.

Furthermore, in the present embodiment, an anionic solution is employed as the pre-processing liquid Qq. Specifically, in the present embodiment, for example, a solution that contains anionic water-soluble resin, water, and organic solvent is employed as the pre-processing liquid Qq. More specifically, in the present embodiment, resin containing a hydrophilic anionic radical, such as a carboxyl radical or a sulfone radical, is employed as the anionic water-soluble resin. For example, acrylic resin, styrenic resin, styrene-acrylic resin, vinyl resin, polyurethane resin, polyester resin, or the like may be employed as the anionic water-soluble resin. As an example, an instance where the styrene-acrylic resin is employed as the anionic water-soluble resin is described below.

Furthermore, in the present embodiment, a cationic solution is employed as the reaction liquid Qr. Specifically, in the present embodiment, for example, a solution that contains multivalent metal salt, water, and organic solvent is employed as the reaction liquid Qr. More specifically, in the present embodiment, for example, calcium salt is employed as the multivalent metal salt. For example, calcium chloride, calcium acetate, or the like may be employed as the multivalent metal salt. In the present embodiment, because the calcium salt is employed as the multivalent metal salt, for example, when compared with an aspect in which magnesium salt is employed as the multivalent metal salt, reactivity between the pre-processing liquid Qq and the reaction liquid Qr can be increased and the printing speed can be increased. Furthermore, in the present embodiment, because the calcium salt is employed as the multivalent metal salt, for example, when compared with an aspect in which barium salt is employed as the multivalent metal salt, although the recording medium P is used for an intended use in food package, clothes, or the like that has a likelihood of coming into contact with a human body, a component that is contained in the reaction liquid Qr can be suppressed from exerting a harmful influence on the human body. In the following, as an example, an instance where the calcium chloride is employed as the multivalent metal salt will be described below. A solution can be created that has a higher concentration of calcium ions, since the calcium chloride has higher water solubility, for example, when compared with calcium lactate or the like. It is noted that for an intended use in which deliquescency of the calcium chloride is likely to be problematic, the calcium acetate may be used that has somewhat less water solubility, but without deliquescency and has the same level of safety to the human body.

It is noted that as organic solvent that is contained in the pre-processing liquid Qq and the reaction liquid Qr, for example, glycol ether-type solvent, 1- and 2-alkyl diol-type solvent, normal hydrocarbon diol-type solvent, or solvent that results from mixing some of or all of these may be used. Furthermore, in addition to the component described above, some or all of a PH conditioner, a surfactant, and a chelating agent may be added to the pre-processing liquid Qq and the reaction liquid Qr.

During the reaction-liquid applying step after the pre-processing liquid Qq is applied on the recording medium P, when the reaction liquid Qr is applied on the recording medium P, anionic water-soluble resin that is contained in the pre-processing liquid Qq and cationic calcium chloride that is contained in the reaction liquid Qr react with each other and thus mixed liquid Qqr is generated. Specifically, in the present embodiment, during the reaction-liquid applying step, an anionic radical that is retained by water-soluble resin which is contained in the pre-processing liquid Qq, and a calcium ion that is contained in the reaction liquid Qr react with each other, and thus the water-soluble resin that is contained in the pre-processing liquid Qq is insolubilized and condenses, and, along with this, hydrochloric acid is generated.

Furthermore, in the present embodiment, an amount of applying of the reaction liquid Qr that is applied during the reaction liquid applying step, and an amount of containing of calcium chloride that is contained in the reaction liquid Qr are adjusted in such a manner that the mixed liquid Qqr is cationic. For this reason, in the present embodiment, of the calcium chloride that is contained in the reaction liquid Qr, calcium chloride that remains in surplus without reacting with an anionic radical of the water-soluble resin that is contained in the pre-processing liquid Qq remains in the mixed liquid Qqr.

Figure 5:
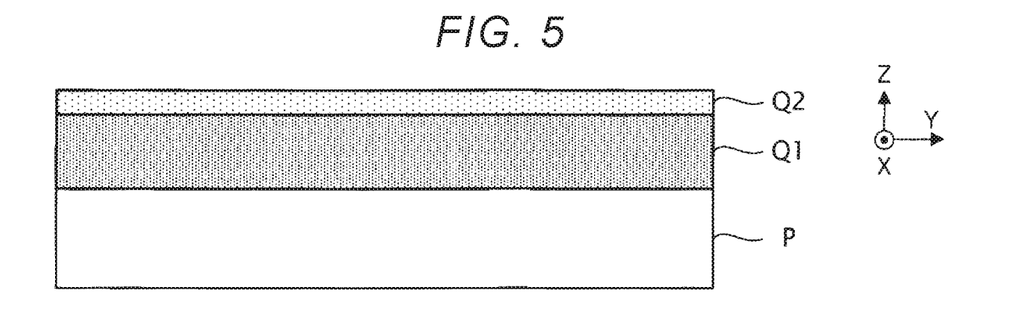
FIG. 5 is a descriptive diagram for describing an example of processing-liquid drying processing.

FIG. 5 is a diagram illustrating an aspect of the recording medium P that results when the processing-liquid drying processing is performed as the image formation processing. As described above, the ink jet printer 1 performs the processing-liquid drying processing, as the image formation processing, subsequently to the pre-processing. At this point, a step in which the processing-liquid drying processing is performed as the image formation processing is an example of a "first drying step." Furthermore, the processing-liquid drying unit 80 that performs the processing-liquid drying processing is an example of a "first drying unit."

As described above, subsequently to the reaction-liquid applying step, the mixed liquid Qqr that is present on the recording medium P contains water-soluble resin that is insolubilized and condenses, hydrochloric acid, and calcium chloride. For this reason, in the processing-liquid drying processing subsequent to the reaction-liquid applying step, when the mixed liquid Qqr is dried, the hydrochloric acid in the mixed liquid Qqr evaporates along with water. Furthermore, in the processing-liquid drying processing, when the mixed liquid Qqr is dried, as illustrated in FIG. 5, a condensation layer Q1 that is made from the water-soluble resin that condenses as a result of reacting with calcium is formed on the recording medium P, or a precipitate layer Q2 is formed that results from the calcium chloride in surplus within the mixed liquid Qqr precipitating on the condensation layer Q1.

Figure 6:
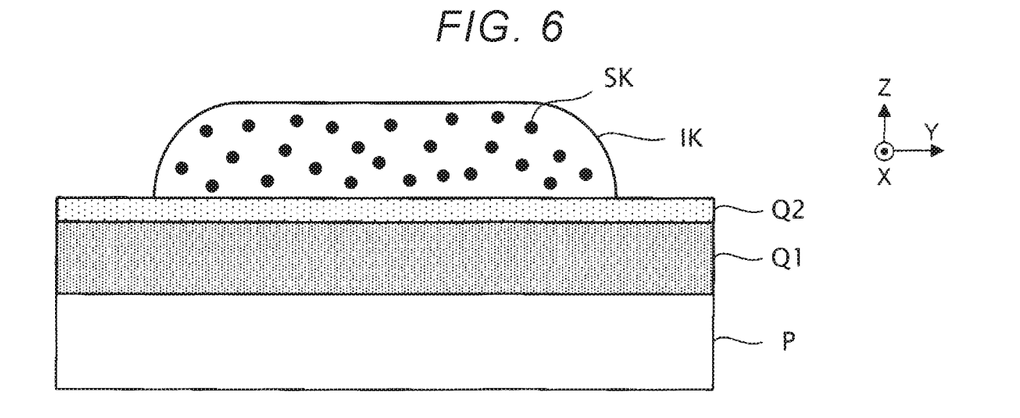
FIG. 6 is a descriptive diagram for describing an example of printing processing.
Figure 7:
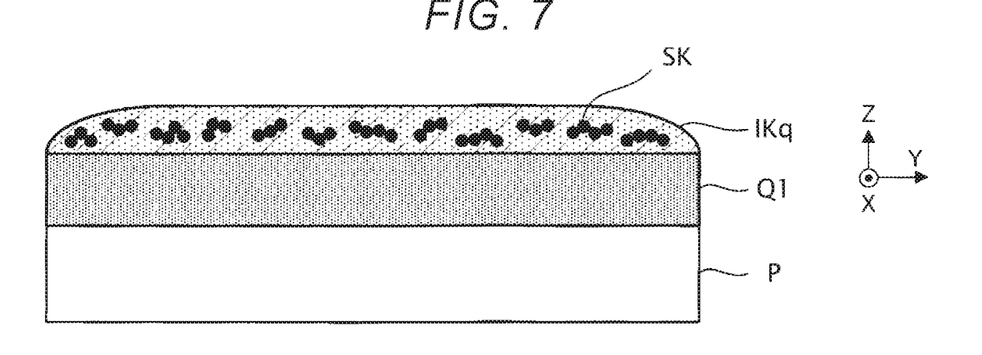
FIG. 7 is a descriptive diagram for describing an example of the printing processing.
Figure 8:
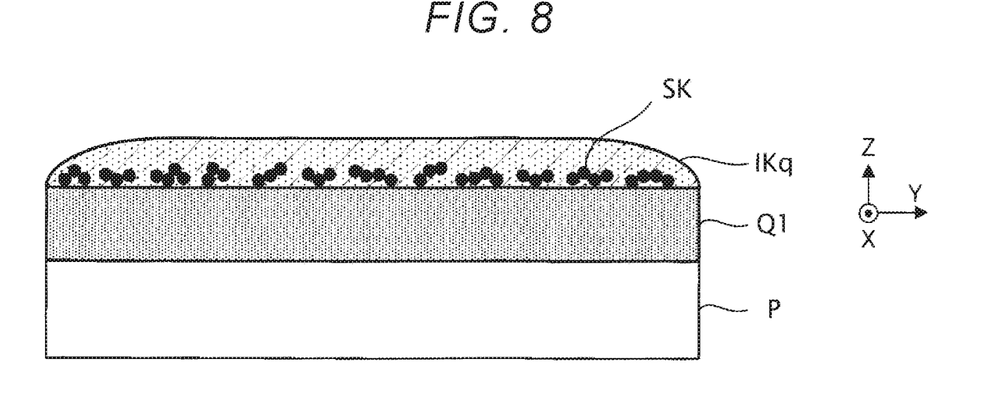
FIG. 8 is a descriptive diagram for describing an example of the printing processing.

FIGS. 6 to 8 are diagrams, each illustrating an aspect of the recording medium P that results from which the printing processing is performed as the image formation processing. As described above, the ink jet printer 1 performs the printing processing, as the image formation processing, subsequently to the processing-liquid drying processing. At this point, a step in which the printing processing is performed as the image formation processing is an example of an "ink discharging step."

In the present embodiment, anionic ink is employed as ink. Specifically, in the present embodiment, for example, solution that contains anionic color material, anionic water-soluble resin, water, and organic solvent, is employed as ink. At this point, the water-soluble resin that is used for the ink may be the same as water-soluble resin that is used for the pre-processing liquid Qq and the reaction liquid Qr. Furthermore, the anionic color material, for example, is dye, pigment, or the like. Furthermore, in addition to the component described above, some or all of a PH conditioner, a surfactant, and a chelating agent may be added to the ink.

For convenience of description, the ink adhered to the recording medium P during the printing processing is hereinafter expressed as "ink IK," and the color material and the water-soluble resin that are included in the ink IK are hereinafter expressed simply as "color material SK."

FIG. 6 is a diagram illustrating an aspect of the recording medium P at a moment in time when the ink IK is landed on the recording medium P. As illustrated in FIG. 6, the color material SK is distributed within the ink IK.

FIG. 7 is a diagram illustrating an aspect of the recording medium P, which is subsequent to the aspect of the recording medium P in FIG. 6. As illustrated in FIG. 7, the calcium chloride that is contained the precipitate layer Q2 dissolves in the water that is contained in the ink IK. In some instances, for convenience of description, a solution that results from the calcium chloride making up the precipitate layer Q2 dissolving into the ink IK is hereinafter expressed as "dissolution solution IKq." Then, when the calcium chloride of the precipitate layer Q2 dissolves in the ink IK and thus the dissolution solution IKq is generated, calcium that is contained in the dissolution solution IKq, and an anionic radical that is retained by the color material SK which is contained in the dissolution solution IKq react with each other, and thus the color material SK condenses within the dissolution solution IKq.

FIG. 8 is a diagram illustrating an aspect of the recording medium P, which is subsequent to the aspect of the recording medium P in FIG. 7. The calcium that reacts with the water-soluble resin that is contained in the condensation layer Q1 combines with the anionic radical that is retained by the color material SK which is contained in the dissolution solution IKq. For this reason, as illustrated in FIG. 8, the color material SK that condenses within the dissolution solution IKq is fixed to the condensation layer Q1. Accordingly, according to the present embodiment, "excessive condensing", a phenomenon where the color material SK that is contained in the dissolution solution IKq further shrinks from a state that is illustrated in FIG. 7, can be prevented from occurring. It is noted that for easy understanding, the color material SK is described as being fixed to the condensation layer Q1 after the condensing of the color material SK occurs, but this is a phenomenon where in practice, the condensing and the fixing proceed concurrently.

It is noted that, although omitted from the drawings, as described above, the ink jet printer 1 performs the ink drying processing, as the image formation processing, subsequently to the printing processing. A step in which the ink drying processing is performed as the image formation processing is an example of a "second drying step."

3. Reference Example

A "reference example" that is the aspect that the image formation processing does not include the pre-processing-liquid applying step and the pre-processing liquid Qq is not applied on the recording medium P will be described below with reference to FIGS. 9 and 12 in order to clarify the significance of the fact that the image formation processing according to the present embodiment includes the pre-processing-liquid applying step.

Figure 9:
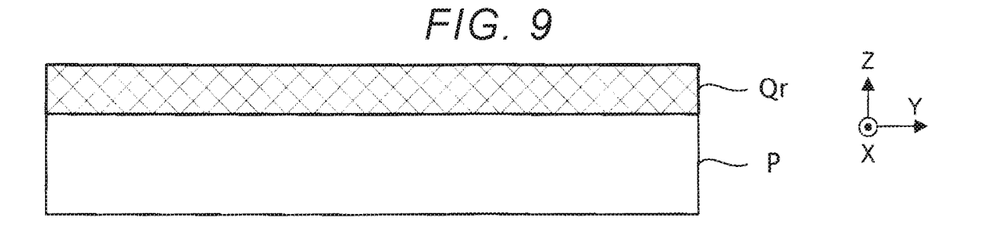
FIG. 9 is a descriptive diagram for describing an example of image formation processing relating to a reference example.

In the reference example, in the image formation processing, as illustrated in FIG. 9, first, the reaction liquid Qr is applied on the recording medium P without the pre-processing liquid Qq being applied thereon. Although not illustrated, the reaction liquid Qr is dried thereafter, and thus the precipitate layer Q2, which results from the calcium chloride within the reaction liquid Qr precipitating, is formed.

Figure 10:
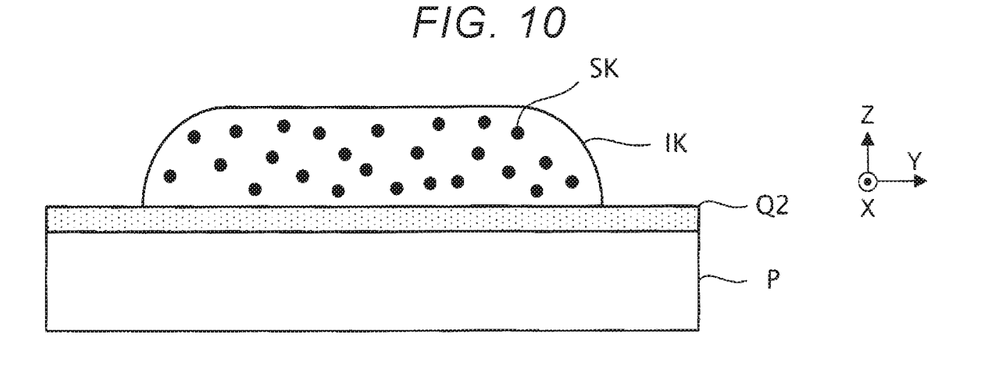
FIG. 10 is a descriptive diagram for describing an example of the image formation processing relating to the reference example.

Next, in the reference example, as illustrated in FIG. 10, the ink IK is adhered to the recording medium P.

Figure 11:
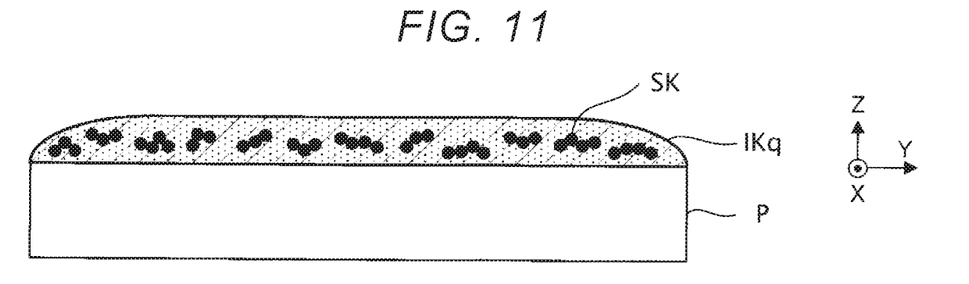
FIG. 11 is a descriptive diagram for describing an example of the image formation processing relating to the reference example.

Next, in the reference example, as illustrated in FIG. 11, the calcium chloride that is contained in the precipitate layer Q2 dissolves in the ink IK, and thus the dissolution solution IKq is generated and the color material SK condenses within the dissolution solution IKq. However, in the image formation processing according to the reference example, because the condensation layer Q1 is not present, the color material SK that condenses within the dissolution solution IKq can freely move within the dissolution solution IKq.

Figure 12:
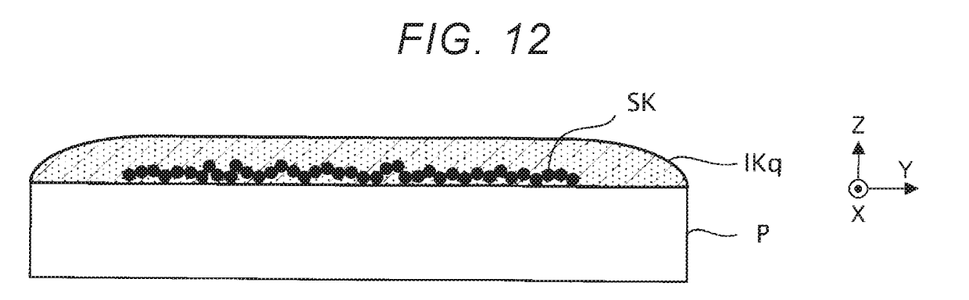
FIG. 12 is a descriptive diagram for describing an example of the image formation processing relating to the reference example.

For this reason, in the reference example, thereafter, as illustrated in FIG. 12, the excessive condensing occurs in which the color material SK that condenses within the dissolution solution IKq further shrinks. Accordingly, in the reference example, a pattern of the image formed on the recording medium P is distorted, and the image representing the printing data Img cannot be precisely formed on the recording medium P. If the multivalent metal salt that is contained in the reaction liquid Qr is replaced with low-reactivity magnesium salt or the like, the excessive condensing can be prevented, but a condensing speed decreases. Because of this, an image quality problem other than the excessive condensing such as bleeding or a coffee-stain phenomenon becomes apparent when the printing speed is increased.

In contrast with this, in the present embodiment, in the pre-processing, the pre-processing liquid Qq and the reaction liquid Qr are applied on the recording medium P and the pre-processing liquid Qq and the reaction liquid Qr are caused to react with each other. Thus, the cationic mixed liquid Qqr is generated on the recording medium P. Then, in the present embodiment, in the processing-liquid drying processing, the mixed liquid Qqr is dried, and thus, in addition to the precipitate layer Q2, the condensation layer Q1 is generated. Accordingly, in the present embodiment, the color material SK that condenses within the dissolution solution IKq is suppressed from freely moving within the dissolution solution IKq, and thus it is possible that the excessive condensing is prevented from occurring. For this reason, according to the present embodiment, the printing speed and printing image quality are compatible with each other by using the high-reactivity multivalent metal salt such as calcium.

4. Implementation Example

An implementation example of the present embodiment will be described below, but the present embodiment is not limited to the implementation example that will be described below.

In the implementation example, FE 2001 that is polyethylene terephthalate film manufactured by FUTAMURA Chemical Co., Ltd is employed as the recording medium P.

Furthermore, in the implementation example, as shown in Table 1, the pre-processing liquid Qq is configured in such a manner that styrene-acrylic resin accounts for 8 mass %, that normal hydrocarbon diol-type solvent accounts for 13 mass %, that 1- and 2-alkyl diol-type solvent accounts for 3 mass %, and that a surfactant accounts for 2 mass %. Furthermore, pure water is added in such a manner that a total mass of the pre-processing liquid Qq is 100 mass %. Then, during the pre-processing-liquid applying step, the pre-processing liquid Qq is applied on the recording medium P in such a manner that an amount of applying per one square inch is 2 mg.

Furthermore, in the implementation example, as shown in Table 1, the reaction liquid Qr is configured in such a manner that normal hydrocarbon diol-type solvent accounts for 15 mass %, that 1- and 2-alkyl diol-type solvent accounts for 3 mass %, that a surfactant accounts for 2 mass %, and that calcium chloride accounts for 3 mass %. Furthermore, pure water is added in such a manner that a total mass of the reaction liquid Qr is 100 mass %. Then, during the reaction-liquid applying step, the reaction liquid Qr is applied on the recording medium P in such a manner that an amount of applying per one square inch is 3 mg.

Furthermore, in the implementation example, as shown in Table 2, the ink is configured with various types of pigment, styrene-acrylic resin, normal hydrocarbon diol-type solvent, 1- and 2-alkyl diol-type solvent, a surfactant, and pure water.

TABLE 1

|  | Pre-processing liquid | Reaction Liquid |
| --- | --- | --- |
| Styrene-acrylic resin | 8 | 0 |
| Normal hydrocarbon diol-type solvent | 13 | 15 |
| 1- and 2-alkyl diol-type solvent | 3 | 3 |
| Surfactant | 2 | 2 |
| Calcium chloride | 0 | 3 |
| Pure water | Balance | Balance |
| Total (Mass %) | 100 | 100 |

TABLE 2

|  | Cyan ink | Magenta ink | Yellow ink | Black ink | White ink |
| --- | --- | --- | --- | --- | --- |
| Cyan pigment | 2 | 0 | 0 | 0 | 0 |
| Magenta pigment | 0 | 1 | 0 | 0 | 0 |
| Yellow pigment | 0 | 0 | 4 | 0 | 0 |
| Black pigment | 0 | 0 | 0 | 2 | 0 |
| White pigment | 0 | 0 | 0 | 0 | 7 |
| Styrene-acrylic resin | 9 | 7 | 10 | 9 | 12 |
| Normal hydrocarbon diol-type solvent | 13 | 10 | 14 | 11 | 9 |
| 1- and 2-alkyl diol-type solvent | 3 | 3 | 3 | 3 | 3 |
| Surfactant | 2 | 2 | 2 | 2 | 2 |
| Pure water | Balance | Balance | Balance | Balance | Balance |
| Total (Mass %) | 100 | 100 | 100 | 100 | 100 |

Furthermore, in the implementation example, the transportation speed Mv at which the recording medium P is transported by the medium transportation unit 30 is set to 50 m per minute, and the gap Lqr is set to 25 cm.

Furthermore, in the implementation example, for the air Wa that is blown by the air blowing unit 71 of the ink drying unit 70 and the air Wb that is blown by the air blowing unit 81 of the processing-liquid drying unit 80, the temperature Ta and the temperature Tb are both set to 80° C., and the air-blowing speed Va and the air-blowing speed Vb are both set to 8 m per second.

Figure 13:
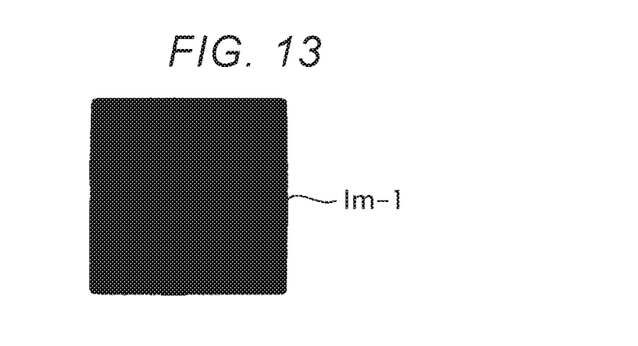
FIG. 13 is a diagram illustrating an image that is formed on a recording medium in an experiment relating to an implementation example.

In the implementation example, under the condition described above, the image formation processing was performed on the recording medium P, and it was verified that the excessive condensing was suppressed from occurring, and that the image representing the printing data Img was precisely formed. For example, in the implementation example, when the printing data Img represented a square image in black against a background in white, as illustrated in FIG. 13, the experiment verified that the image representing the printing data Img was precisely formed on the recording medium P.

Figure 14:
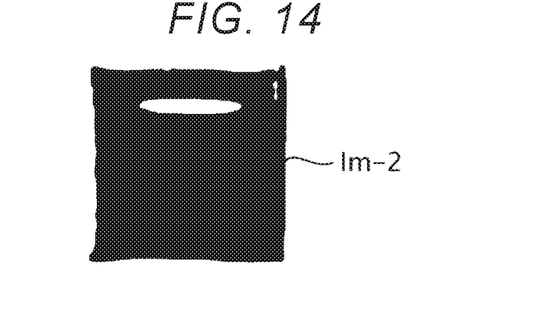
FIG. 14 is a diagram illustrating an image that is formed on the recording medium in an experiment relating to a reference example.

It is noted that in the implementation example, as in the reference example, the image formation processing was performed on the recording medium P in the same manner with the transportation speed being setting to Mv 50 m per minute, without including the pre-processing-liquid applying step, and it was verified that the excessive condensing occurred and that the image representing the printing data Img was not precisely formed. For example, in the reference example, when the printing data Img represented a square image in black against a background in white, as illustrated in FIG. 14, the experiment verified that the image representing the printing data Img was not precisely formed on the recording medium P.

5. Conclusion as to Embodiment

As described above, a recording method according to the present embodiment includes a first applying step of applying anionic pre-processing liquid Qq to a recording medium P, a second applying step of applying cationic reaction liquid Qr to the recording medium P, causing the pre-processing liquid Qq and the reaction liquid Qr to react with each other, generating mixed liquid Qqr, subsequently to the first applying step, and a first drying step of drying the mixed liquid Qqr subsequently to the second applying step, in which the mixed liquid Qqr is cationic.

As in the related art, when the anionic pre-processing liquid Qq is not applied on the recording medium P and the cationic reaction liquid Qr is applied on the recording medium P, if the reaction liquid Qr is applied on the recording medium P and then anionic ink is adhered on the recording medium P, color material and resin in the ink react with a cationic component of the reaction liquid Qr, and the color material and the resin in the ink shrink before the ink is dried. When the color material and the resin in the ink shrink, in some instances, a phenomenon that is referred to as so-call excessive condensing in which an image that is represented by the ink shrinks, and printing image quality degrades occurs. When high-reactivity metal salt is used for the reaction liquid Qr for high-speed printing, the excessive condensing occurs remarkably.

In contrast with this, according to the present embodiment, because the anionic pre-processing liquid Qq is applied on the recording medium P and then the cationic reaction liquid Qr is applied on the recording medium P, an anionic component of the pre-processing liquid Qq reacts with a cationic component of the reaction liquid Qr and condenses, and a condensation layer Q1 is formed. Furthermore, according to the present embodiment, when the mixed liquid Qqr is dried, a component that does not react with the anionic component of the pre-processing liquid Qq, of cationic components of the reaction liquid Qr, precipitates and a precipitate layer Q2 is formed. For this reason, according to the present embodiment, when the anionic ink is adhered to the recording medium P subsequently to the first drying step, the color material and the resin in the ink react with the precipitate layer Q2 and shrinks, and along with this, the color material and the resin in the ink are fixed to the condensation layer Q1. For this reason, according to the present embodiment, although the reaction liquid Qr containing high-reactivity calcium salt or the like is used in order to increase a printing speed, it is possible that movement and diffusion of the color material in the ink on the recording medium P are limited and that the excessive condensing is prevented from occurring and the printing speed and the printing image quality can be compatible with each other.

Furthermore, the recording method according to the present embodiment includes an ink discharging step of adhering the anionic ink to the recording medium P subsequently to the first drying step.

That is, according to the present embodiment, when the anionic ink is applied on the recording medium P subsequently to the first drying step, because the color material and the resin in the ink are fixed to the condensation layer, it is possible that the excessive condensing is prevented from occurring.

Furthermore, the recording method according to the present embodiment includes a second drying step of drying the ink subsequently to the ink discharging step.

That is, according to the present embodiment, because the second drying step of drying the ink after adhering the ink to the recording medium P is included, the adhesion of the ink to the recording medium P can be increased when compared with an instance where the second drying step is not included.

Furthermore, in the recording method according to the present embodiment, a processing time taken for the second drying step is longer than a processing time taken for the first drying step.

That is, according to the present embodiment, because the processing time taken for the second drying step is longer than the processing time taken for the first drying step, the adhesion of the ink to the recording medium P can be increased when compared with an instance where the processing time taken for the second drying step is equal to or shorter than the processing time taken for the first drying step.

Furthermore, in the recording method according to the present embodiment, the pre-processing liquid Qq contains water-soluble resin, water, and organic solvent.

That is, according to the present embodiment, because the pre-processing liquid Qq containing the water-soluble resin is applied on the recording medium P and then the cationic reaction liquid Qr is applied to the recording medium P, the water-soluble resin of the pre-processing liquid Qq reacts with the cationic component of the reaction liquid Qr, and the condensation layer Q1 is formed. For this reason, according to the present embodiment, when the anionic ink is applied on the recording medium P subsequently to the first drying step, it is possible that the color material and the resin in the ink are fixed to the condensation layer Q1 and that the excessive condensing is prevented from occurring.

Furthermore, in the recording method according to the present embodiment, the reaction liquid Qr contains multivalent metal salt, water, and organic solvent.

That is, according to the present embodiment, because the anionic pre-processing liquid Qq is applied on the recording medium P and then the reaction liquid Qr containing the multivalent metal salt is applied on the recording medium P, an anionic component in the pre-processing liquid Qq reacts with the multivalent metal salt in the reaction liquid Qr, and the condensation layer Q1 is formed. For this reason, according to the present embodiment, when the anionic ink is applied on the recording medium P subsequently to the first drying step, it is possible that the color material and the resin in the ink are fixed to the condensation layer Q1 and that the excessive condensing is prevented from occurring.

Furthermore, in the recording method according to the present embodiment, the multivalent metal salt is calcium chloride.

That is, according to the present embodiment, because the calcium chloride is employed, as the multivalent metal salt, that has little influence on a human body, even when the recording medium P is used for an intended use in food package, clothes, or the like that has a likelihood of coming into contact with a human body, the recording medium P can be suppressed from exerting a harmful influence on the human body. Furthermore, because the calcium chloride has high water solubility, a high concentration is easy to achieve, and in conjunction with a high level of reactivity of the calcium, a high printing speed and high image quality can be compatible with each other.

Furthermore, in the recording method according to the present embodiment, the multivalent metal salt is calcium acetate.

That is, according to the present embodiment, because the calcium acetate is employed, as the multivalent metal salt, that has little influence on a human body, even when the recording medium P is used for an intended use in food package, clothes, or the like that has a likelihood of coming into contact with a human body, the recording medium P can be suppressed from exerting a harmful influence on the human body. Furthermore, the calcium acetate has lower water solubility than the calcium chloride, but is possibly concentrated more highly than the calcium lactate or the like, and in addition, has no deliquescency differently than the calcium chloride. Because of this, the calcium acetate, although it remains in the printing medium P, does not dissolve, and thus does not contribute to a defect cause of offset, blocking, or the like.

Furthermore, in the recording method according to the present embodiment, an interval from when the first applying step is ended to when the second applying step is started is equal to or longer than 0.1 seconds and is equal to or shorter than 1.0 second.

That is, according to the present embodiment, because the interval from when the first applying step is ended to when the second applying step is started is equal to or longer than 0.1 seconds, the pre-processing liquid Qq and the reaction liquid Qr can be prevented from being mixed before being adhered to the recording medium P. Furthermore, according to the present embodiment, because the interval from when the first applying step is ended to when the second applying step is started is equal to or shorter than 1.0 second, it is possible that the degradation of the reactivity with the reaction liquid Qr due to the volatilization of water of the pre-processing liquid Qq is suppressed, when compared with an instance where the interval from when the first applying step is ended to when the second applying step is started is longer than 1.0 second.

B. Modification Example

A modification to each embodiment described above can be made in various ways. As examples, aspects of specific modifications are described below. Two or more aspects that are selected arbitrarily from examples that will be given below can be combined suitably within a range where no conflict occurs. It is noted that if a constituent element in a modification example that will be given below as an example is the same in operation and function as in the embodiment, such a constituent element is given the reference character that is referred to in the above description, and a detailed description thereof is suitably omitted.

First Modification Example

In the embodiment described above, an aspect that the pre-processing liquid Qq is discharged with an ink jet type using the pre-processing-liquid discharging head 61 is given as an example, but the present disclosure is not limited to this aspect. Instead of with the pre-processing-liquid discharging head 61, with a roller coater, the pre-processing liquid Qq may be applied on the recording media P, and every well-known applying means may also be used such as a spray coater or a slit coater. The same also applies to the application of the reaction liquid Qr, but when a contact-type applying method is used, there is a need to have a cleaning function additionally because resin that condenses due to reaction may be adhered to the applying means.

Second Modification Example

In the embodiment and the first modification example, which are described above, an instance where that, in the printing unit 50, ink that is to be discharged on the recording medium P contains color ink and white ink is given as an example, but the present disclosure is not limited to this aspect. For example, metallic ink may be contained in the ink that is discharged on the recording medium P in the printing unit 50. Furthermore, clear ink or the like may be contained in order to control surface glossiness, and ink of so-called particular color such as fluorescent color may be contained. Furthermore, as another example, a configuration in which only black ink is contained may be employed for a printing machine dedicated for white and black.

What is claimed is:

1. A recording method comprising:
 a first applying step of applying anionic first processing liquid on a medium;
 a second applying step of applying cationic second processing liquid on the medium, causing the first processing liquid and the second processing liquid to react with each other, and generating mixed liquid, subsequently to the first applying step;
 a first drying step of drying the mixed liquid subsequently to the second applying step;
 an ink discharging step of adhering anionic ink to the medium subsequently to the first drying step; and
 a second drying step of drying the ink subsequently to the ink discharging step, wherein
 the mixed liquid is cationic, and
 a processing time taken for the second drying step is longer than a processing time taken for the first drying step.

2. The recording method according to claim 1, wherein the first processing liquid contains water-soluble resin, water, and organic solvent.

3. The recording method according to claim 1, wherein the second processing liquid contains multivalent metal salt, water, and organic solvent.

4. The recording method according to claim 3, wherein the multivalent metal salt is calcium chloride.

5. The recording method according to claim 3, wherein the multivalent metal salt is calcium acetate.

6. The recording method according to claim 1, wherein an interval from when the first applying step is ended to when the second applying step is started is equal to or longer than 0.1 seconds and is equal to or shorter than 1.0 second.

7. A printing apparatus comprising:
 a first applying unit that applies anionic first processing liquid on a medium;
 a second applying unit that applies cationic second processing liquid on the medium, causes the first processing liquid and the second processing liquid to react with each other, and generates mixed liquid, after the first processing liquid is applied on the medium;
 a first drying unit that dries the mixed liquid for a first processing time;
 an ink discharging unit that adheres anionic ink to the medium after the first drying unit dries the mixed liquid; and
 a second drying unit that dries the ink after the ink discharging unit adheres the anionic ink, the second drying unit drying the ink for a second processing time that is longer than the first processing time, wherein
 the mixed liquid is cationic.

8. A printing apparatus comprising:
 a first applying unit that applies anionic first processing liquid on a medium;
 a second applying unit that applies cationic second processing liquid on the medium, causes the first processing liquid and the second processing liquid to react with each other, and generates mixed liquid, after the first processing liquid is applied on the medium; and
 a first drying unit that dries the mixed liquid, wherein
 the mixed liquid is cationic, and
 the second applying unit starts applying the cationic second processing liquid with an interval from when applying of the anionic first processing liquid by the first applying unit is ended to when applying of the cationic second processing liquid by the second applying unit is started, and the interval is equal to or longer than 0.1 seconds and is equal to or shorter than 1.0 second.

9. A recording method comprising:
 a first applying step of applying anionic first processing liquid on a medium;
 a second applying step of applying cationic second processing liquid on the medium, causing the first processing liquid and the second processing liquid to react with each other, and generating mixed liquid, subsequently to the first applying step; and
 a first drying step of drying the mixed liquid subsequently to the second applying step, wherein
 the mixed liquid is cationic, and
 an interval from when the first applying step is ended to when the second applying step is started is equal to or longer than 0.1 seconds and is equal to or shorter than 1.0 second.

10. The recording method according to claim 9, further comprising:
 an ink discharging step of adhering anionic ink to the medium subsequently to the first drying step.

11. The recording method according to claim 10, further comprising:
 a second drying step of drying the ink subsequently to the ink discharging step.

12. The recording method according to claim 9, wherein the first processing liquid contains water-soluble resin, water, and organic solvent.

13. The recording method according to claim 9, wherein the second processing liquid contains multivalent metal salt, water, and organic solvent.

14. The recording method according to claim 13, wherein the multivalent metal salt is calcium chloride.

15. The recording method according to claim 13, wherein the multivalent metal salt is calcium acetate.

\* \* \* \* \*